(12) United States Patent
Nagaraj

(10) Patent No.: US 10,656,839 B2
(45) Date of Patent: *May 19, 2020

(54) APPARATUS AND METHOD FOR CACHE PROVISIONING, CONFIGURATION FOR OPTIMAL APPLICATION PERFORMANCE

(71) Applicant: PrimaryIO, Inc., San Carlos, CA (US)

(72) Inventor: Murali Nagaraj, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,697

(22) Filed: Nov. 19, 2018

(65) Prior Publication Data

US 2019/0087092 A1 Mar. 21, 2019

Related U.S. Application Data

(63) Continuation of application No. 14/660,546, filed on Mar. 17, 2015, now Pat. No. 10,133,488.

(Continued)

(51) Int. Cl.
*G06F 3/06* (2006.01)
*G06F 12/0868* (2016.01)
*G06F 12/08* (2016.01)

(52) U.S. Cl.
CPC .......... *G06F 3/061* (2013.01); *G06F 3/0653* (2013.01); *G06F 3/0659* (2013.01); *G06F 3/0676* (2013.01); *G06F 3/0689* (2013.01); *G06F 12/08* (2013.01); *G06F 12/0868* (2013.01); *G06F 2212/1024* (2013.01); *G06F 2212/261* (2013.01)

(58) Field of Classification Search
CPC ...... G06F 3/061; G06F 3/0689; G06F 3/0653; G06F 3/0659; G06F 12/08; G06F 12/0868; G06F 3/0676; G06F 2212/261; G06F 2212/1024
See application file for complete search history.

(56) References Cited

U.S. PATENT DOCUMENTS 5,657,445 A 8/1997 Pearce
5,732,239 A 3/1998 Tobagi et al.
(Continued)

OTHER PUBLICATIONS

Advisory Action for U.S. Appl. No. 14/660,931, dated Dec. 6, 2016, having named inventors Sumit Kumar & Sumit Kapoor.
(Continued)

*Primary Examiner* — Christopher D Birkhimer
(74) *Attorney, Agent, or Firm* — Miller Nash Graham & Dunn LLP

(57) ABSTRACT

In an embodiment of the invention, a method comprises: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance. In another embodiment of the invention, an apparatus comprises: a system configured to record application-level heuristics and IO-level heuristics, to correlate and analyze the application-level heuristics and IO-level heuristics, and based on an analysis and correlation of the application-level heuristics and IO-level heuristics, to generate a policy for achieving optimal application performance.

20 Claims, 2 Drawing Sheets

Related U.S. Application Data

(60) Provisional application No. 61/954,007, filed on Mar. 17, 2014.

(56) References Cited

U.S. PATENT DOCUMENTS

| | | | |
|---|---|---|---|
| 5,742,792 A | 4/1998 | Yanai et al. | |
| 5,854,941 A | 12/1998 | Ballard et al. | |
| 6,671,791 B1 | 12/2003 | McGrath | |
| 6,754,696 B1 | 6/2004 | Kamath et al. | |
| 7,451,291 B2 | 11/2008 | Justiss et al. | |
| 7,451,348 B2* | 11/2008 | Pecone | G06F 1/305 714/14 |
| 7,487,391 B2* | 2/2009 | Pecone | G06F 1/28 714/14 |
| 7,542,999 B2 | 6/2009 | Kamath et al. | |
| 7,661,002 B2* | 2/2010 | Pecone | G06F 1/305 713/300 |
| 7,895,398 B2* | 2/2011 | Shet | G06F 12/0871 711/129 |
| 7,930,270 B2* | 4/2011 | Tsang | G06F 17/30165 707/610 |
| 7,930,481 B1* | 4/2011 | Nagler | G06F 12/0804 710/18 |
| 7,945,945 B2* | 5/2011 | Graham | H04L 29/12009 713/151 |
| 7,949,834 B2* | 5/2011 | Morrow | G06F 12/121 711/134 |
| 8,090,911 B2 | 1/2012 | Ouren et al. | |
| 8,171,219 B2* | 5/2012 | Trika | G06F 12/0862 711/112 |
| 8,181,004 B2* | 5/2012 | Ferren | G06F 9/3844 712/229 |
| 8,291,166 B2* | 10/2012 | Cornwell | G06F 12/0888 711/103 |
| 8,370,850 B2* | 2/2013 | Nochimowski | G06F 3/0607 711/123 |
| 8,402,049 B2* | 3/2013 | Miyajima | G06F 17/30902 707/769 |
| 8,402,221 B2* | 3/2013 | Arnold | G06F 9/30018 341/87 |
| 8,443,134 B2* | 5/2013 | Flynn | G06F 9/52 711/103 |
| 8,458,282 B2* | 6/2013 | Chen | H04L 49/9021 709/213 |
| 8,495,302 B2 | 7/2013 | Ouren et al. | |
| 8,549,222 B1 | 10/2013 | Kleiman et al. | |
| 8,561,148 B2* | 10/2013 | Hayton | G06F 21/6218 726/4 |
| 8,578,127 B2 | 11/2013 | Thatcher et al. | |
| 8,583,874 B2* | 11/2013 | Dubrovin | G06F 12/126 711/134 |
| 8,601,222 B2 | 12/2013 | Flynn et al. | |
| 8,606,998 B2* | 12/2013 | Zulauf | G06F 12/0862 711/125 |
| 8,607,001 B2* | 12/2013 | Zhao | H04L 67/2852 711/133 |
| 8,689,265 B2 | 4/2014 | Lockett et al. | |
| 8,701,163 B2* | 4/2014 | Hockings | G06F 21/6218 726/4 |
| 8,904,117 B1 | 12/2014 | Kalekar et al. | |
| 9,052,993 B2 | 6/2015 | Suzuki et al. | |
| 9,152,648 B2* | 10/2015 | Regni | G06F 17/30221 |
| 9,251,086 B2 | 2/2016 | Peterson et al. | |
| 2001/0007148 A1 | 7/2001 | Murata et al. | |
| 2001/0047454 A1* | 11/2001 | Soderstrom | G06F 3/0605 711/118 |
| 2003/0056060 A1 | 3/2003 | Hertz et al. | |
| 2004/0128459 A1 | 7/2004 | Chanda et al. | |
| 2005/0060316 A1 | 3/2005 | Kamath et al. | |
| 2005/0289312 A1 | 12/2005 | Ghosal et al. | |
| 2006/0170238 A1 | 8/2006 | Justiss et al. | |
| 2007/0028053 A1* | 2/2007 | Shet | G06F 12/0871 711/129 |
| 2007/0033431 A1* | 2/2007 | Pecone | G06F 1/28 714/6.12 |
| 2007/0033432 A1* | 2/2007 | Pecone | G06F 1/305 714/6.12 |
| 2007/0033433 A1* | 2/2007 | Pecone | G06F 1/305 714/6.13 |
| 2008/0288947 A1 | 11/2008 | Gokhale et al. | |
| 2009/0307700 A1* | 12/2009 | Cazorla Almeida | G06F 9/4887 718/103 |
| 2009/0327613 A1* | 12/2009 | Nutter | G06F 12/0875 711/141 |
| 2010/0070711 A1* | 3/2010 | Arimilli | G06F 12/0835 711/122 |
| 2010/0153617 A1* | 6/2010 | Miroshnichenko | G06F 3/061 711/6 |
| 2010/0268907 A1 | 10/2010 | Ouren et al. | |
| 2010/0281216 A1* | 11/2010 | Patel | G06F 12/121 711/118 |
| 2010/0325345 A1* | 12/2010 | Ohno | G06F 11/108 711/103 |
| 2011/0047437 A1* | 2/2011 | Flynn | G06F 9/52 714/758 |
| 2011/0138131 A1* | 6/2011 | Regni | G06F 17/30221 711/133 |
| 2011/0276765 A1* | 11/2011 | Dawkins | G06F 12/0888 711/145 |
| 2011/0295874 A1* | 12/2011 | Miyajima | G06F 17/30902 707/769 |
| 2011/0320436 A1* | 12/2011 | Hokanson | G06F 3/061 707/719 |
| 2012/0066435 A1 | 3/2012 | Colgrove et al. | |
| 2012/0079230 A1 | 3/2012 | Ouren et al. | |
| 2012/0131038 A1 | 5/2012 | Aronovich et al. | |
| 2012/0151149 A1* | 6/2012 | Dubrovin | G06F 12/0862 711/133 |
| 2012/0192073 A1 | 7/2012 | Vallone et al. | |
| 2012/0198032 A1* | 8/2012 | Fitzgerald | H04W 4/00 709/219 |
| 2012/0239857 A1 | 9/2012 | Jibbe et al. | |
| 2012/0278842 A1 | 11/2012 | Look et al. | |
| 2012/0311674 A1* | 12/2012 | Hockings | G06F 21/6218 726/4 |
| 2013/0013861 A1* | 1/2013 | Cornwell | G06F 12/0888 711/118 |
| 2013/0041982 A1* | 2/2013 | Shi | H04L 65/4084 709/217 |
| 2013/0086324 A1* | 4/2013 | Soundararajan | G06F 12/0813 711/122 |
| 2013/0086552 A1 | 4/2013 | Whitney et al. | |
| 2013/0111158 A1 | 5/2013 | Suzuki et al. | |
| 2013/0159341 A1* | 6/2013 | Miyajima | G06F 17/30902 707/769 |
| 2013/0166724 A1* | 6/2013 | Bairavasundaram | G06F 9/5016 709/224 |
| 2013/0185502 A1 | 7/2013 | Ash et al. | |
| 2013/0185504 A1 | 7/2013 | Ash et al. | |
| 2013/0205092 A1* | 8/2013 | Roy | G06F 12/084 711/130 |
| 2013/0205097 A1* | 8/2013 | Flynn | G06F 12/0246 711/142 |
| 2013/0219078 A1 | 8/2013 | Padmanabhan et al. | |
| 2013/0239158 A1 | 9/2013 | Chan et al. | |
| 2013/0254488 A1* | 9/2013 | Kaxiras | G06F 12/0815 711/130 |
| 2013/0318224 A1* | 11/2013 | Cleary | H04L 41/024 709/223 |
| 2013/0326583 A1 | 12/2013 | Freihold et al. | |
| 2014/0019688 A1 | 1/2014 | Ghodsnia et al. | |
| 2014/0059292 A1 | 2/2014 | Phelan et al. | |
| 2014/0068183 A1* | 3/2014 | Joshi | G06F 12/0866 711/114 |
| 2014/0068197 A1* | 3/2014 | Joshi | G06F 12/0866 711/135 |

(56) References Cited

U.S. PATENT DOCUMENTS

| | | | |
|---|---|---|---|
| 2014/0156909 A1* | 6/2014 | Farhan | G06F 12/0862 711/103 |
| 2014/0281121 A1 | 9/2014 | Karamcheti et al. | |
| 2014/0359229 A1 | 12/2014 | Cota-Robles | |
| 2014/0379965 A1 | 12/2014 | Gole et al. | |
| 2015/0074448 A1 | 3/2015 | Ageishi | |
| 2015/0081979 A1 | 3/2015 | Banta et al. | |

OTHER PUBLICATIONS

Anonymous, "Javatuples," Nov. 5, 2010, pp. 1-3, https://web.archive.org/web/20101105112452/http://www.javatuples.org/.

Dictionary.com, "Transient," Oct. 18, 2011, pp. 1-3; https://web.archive.org/web/20111018105151/http://thesaurus.com/browse/transient.

Marco Chiappetta, "SSDs vs. Hard Drives vs. Hybrids: Which Storage Tech is Right for You?", Jan. 17, 2013, pp. 1-7, http://www.pcworld.com/article/2025402/ssds-vs-hard-drives-vs-hybrids-which-storage-tech-is-right-for-you-.html.

Microsoft, "Synchronous and Asynchronous I/O," Oct. 4, 2011, pp. 1-3, https://web.archive.org/web/20111004012327/http://msdn.microsoft.com/en-us/library/windows/desktop/aa365683(v=VS.85).aspx.

Morris Kaashoek, "Chapter 6," Sep. 23, 2010, pp. 1-5, https://web.archive.org/web/20121222071910/http://www.cs.columbia.edu/~junfeng/11sp-w4118/lectures/disk.pdf.

Office Action for U.S. Appl. No. 14/659,773, dated Jun. 30, 2016, having named inventor Murali Nagaraj.

Office Action for U.S. Appl. No. 14/660,931, dated Apr. 22, 2016, having named inventors Sumit Kumar & Sumit Kapoor.

Office Action for U.S. Appl. No. 14/660,931, dated Sep. 12, 2016, having named inventors Sumit Kumar & Sumit Kapoor.

Office Action for U.S. Appl. No. 14/660,935, dated Nov. 15, 2016, having named inventors Anand Mitra, Dilip Ranade et al.

PC Guide, "Logical Block Addressing (LBA)," Sep. 2, 2000, pp. 1-2, https://web.archive.org/web/20000902032612/http://www.pcguide.com/ref/hdd/bios/modesLBA-c.html.

The Linux Documentation Project, "7.6 The Buffer Cache," pp. 1-2, https://web.archive.org/web/20031223081354/http://www.tldp.org/LDP/sag/html/buffer-cache.html.

Webopedia, "API," Jun. 21, 2000, pp. 1-2, https://web.archive.org/web/20000621114956/http://www.webopedia.com/TERM/A/API.html.

Webopedia, "Disk Cache", Oct. 1, 2002, pp. 1-2, https://web.archive.org/web/20021001223846/http://www.webopedia.com/TERM/D/disk_cache.html.

Webopedia, "Logical," Aug. 8, 2002, pp. 1-2, https//web.archive.org/web/20020808144457/http://www.webopedia.com/TERM/L/logical.html.

* cited by examiner

APPARATUS AND METHOD FOR CACHE PROVISIONING, CONFIGURATION FOR OPTIMAL APPLICATION PERFORMANCE

CROSS-REFERENCE(S) TO RELATED APPLICATIONS

This application is a continuation of and claims benefit from U.S. non-provisional patent application Ser. No. 14/660,546, filed Mar. 17, 2015, entitled APPARATUS AND METHOD FOR CACHE PROVISIONING, CONFIGURATION FOR OPTIMAL APPLICATION PERFORMANCE, which claims benefit from U.S. provisional patent application No. 61/954,007, filed Mar. 17, 2014, the disclosures of both of which are incorporated herein by reference in their entirety.

FIELD

Embodiments of the invention relate generally to data storage systems.

DESCRIPTION OF RELATED ART

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against this present disclosure.

Various caching solutions are available for data storage systems. Typically, these caching solutions lack efficiency in a very complex and/or high volume data storage environment. Additionally, these caching solutions do not provide policies that utilize the data sets of applications. Additionally, there is a continuing need for conventional systems to achieved improved performance.

While the above-noted systems are suited for their intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An exemplary embodiment of the invention provides an apparatus and method for cache provisioning, configuration for optimal application performance.

Figure 1:
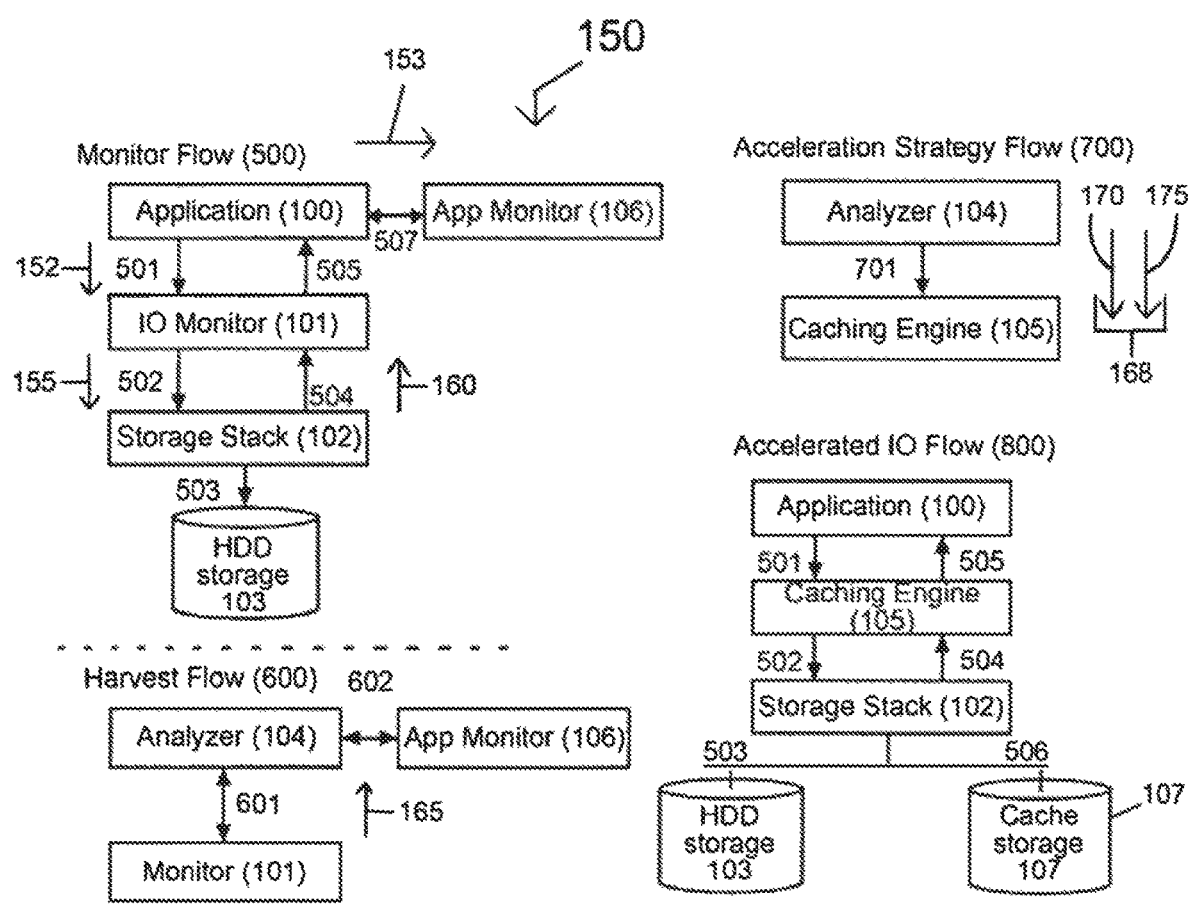
FIG. 1 is a block diagram of an apparatus in accordance with an embodiment of the invention.

FIG. 1 is a block diagram of an apparatus 150 (data storage system 150 or system 150) in accordance with an embodiment of the invention. The system 150 is configured to select (and to provide a method for selecting) caching policies to optimize cache utilization and application performance based on application IO (input/output) profiles. The system 150 is configured assist in cache sizing (and to provide the same method that is extended to assist in cache sizing). In other words, the system 150 is configured to provision (and to provide a method for provisioning) a given size of cache that achieves a certain level of performance improvement.

The overall system performance in the presence of a caching solution and a given cache capacity depend on a number of factors. For example, these factors can include one or more of the following characteristics (or nature) of the IO stream: (1) the shape of the application IO stream (the distribution of the IO stream in terms of timelines), (2) if the IO is bursty in nature or is well spread out, (3) the distribution of the IO size issued by an application, (4) if the IO stream is predominantly reads or writes, (5) if the IO stream is sequential or random, (6) sizes and rates of the IO stream, and/or (7) if the IO stream is exhibiting a locality of reference or if the IO stream is exhibiting a great amount of randomness. Such factors in (1) through (7) above are determined for each system 150, and the appropriate caching policy based on this determination is then designed and applied in system 150 for optimal performance and cache utilization. The factors (1) through (7) are known as IO-related contents.

Examples of the factors (IO-related contents) (1) through (7) of IO streams are now discussed.

Factor (1)—Shape of the IO stream: Common to many businesses—a reporting and analytics use case involves data ingestion into the system followed by data analysis/reporting. The data ingestion is a large sequential write IO stream. This IO stream lasts for a few minutes to several hours depending on the size of the dataset to be analyzed. This IO stream is followed by a large number of small sized random accesses as a result of the "queries" that the analytics software performs. This IO stream of random accesses is followed by a large period of inactivity as new data is gathered.

Factor (2): A bursty IO stream can occur, for example, when a database index is created for the first time or when an application commits a large amount of buffered data to persistent storage. A bursty IO stream can also occur when there is a high volume of user activity which is normally absent, e.g., during a holiday sale.

Factor (3): Most applications have several pieces of information they need or work with to function. These pieces of information are, for example, indexes, logs, tables, and other information such metadata besides user data. These pieces of information also have a preferred size of issuing IO requests for each piece of information. For instance a MySQL database accesses its metadata in chunks of 4096 bytes while user data is accessed in chunks of 16 KB. However, there are several layers of storage software which may influence these IO sizes—due to merging, sorting, and/or buffering. The histogram of IO sizes indicates the exact distribution.

Factor (4): Web server is a popular application in this age of the internet. The IO stream of a Web server application is typically about 90% reads of web pages and about 10% writes of logs. A database application like Oracle Database configured for, e.g., transaction processing typically experiences about 70% reads (queries) and about 30% writes (inserts and updates).

Factor (5): Different parts of an application and different applications exhibit sequential access patterns or random access patterns. For example, the logs of a database are written sequentially while the tables and indexes of logs are accessed randomly. A webserver writes its logs sequentially.

Factor (7): An application like Twitter may have, e.g., about 10 peta bytes of data in its databases. However, it is only the most recent tweets that are accessed frequently. As a consequence, such an application may choose to store the most recent tweets together to ensure that the underlying storage system can retrieve them efficiently. Such a storage scheme is said to exhibit a "temporal locality of reference". Similarly, due to the sluggish nature of a hard disk based system, application and system software store related pieces of information like directory entries and their inodes within the same disk cylinder—this is said to exhibit a "spatial locality of reference".

In accordance with an embodiment of the invention, a three-part caching system 150 is disclosed and presented. The first part of the system 150 comprises an IO (input/output) monitor 101, second part of the system 150 comprises an IO stream analyzer 104, and the third part of the system 150 comprises a caching engine 105. The monitor 101 is deployed for a certain period of time on the system being accelerated. During this time, the monitor 101 interprets the IO stream by collecting various information as described above. Once the monitoring phase completes, the results are analyzed offline by an analyzer program (analyzer 104) which determines the optimal cache size to deliver the desired performance boost. On the other hand for a given cache size, the possible IO performance is also determined.

The monitor 101 (a) identifies the IO stream characteristics and (b) assigns meaning (information) by correlating the IO stream with application-defined objects such as, for example, database indexes. Once this analysis completes, a map of the data is constructed, where the map is indicative of the parts of the primary storage (a) exhibiting a sufficient locality of reference, and (b) contains semantically important content.

Suppose a database application performing transactions is to be optimized. Assume that the application stores its index data in disk blocks 100-1000. Suppose the application is issuing an IO stream which involves accessing blocks in the range 0-10000 in a specific permutation. All IO activity is intercepted by the monitor (101), and the monitor 101 will then keep track of the frequency of block access, which is recorded persistently for future reference. For example, the monitor 101 may record that the blocks in the range 100-1000 were accessed 10 times each in the last 1 (one) hour. Assume that during this time, the rest of the blocks were accessed only 3 times each—this is typical of a query sensitive workload found in many business use cases. Because the caching architecture has a component (106) which understands the meaning of blocks in the range 100-1000, the monitor 106 can then correlate that the index blocks have been accessed more frequently than the rest of the blocks. Once this application insight has been gained, an appropriate decision can be taken. For example, a decision would be to use 100 GB of cache, employ write back policy, and optimize all indexes—and also aggressively prefetch the index blocks so that the application performance can be further optimized.

Based on the IO stream, a decision is made in the relevant acceleration policy. In other words, a decision is made whether to accelerate in write through, write back, write around, or read only modes. The choice is made considering the determined average, peak, and low write rates for provisioning a write back cache space. Provisioning too much write back cache space would be an underutilization of the cache. The cache can only absorb as much writes as can be efficiently copied back to the primary storage.

This three-part system 150 is, for example, useful in both bare metal deployments as well as in server virtualized environments (e.g., a server running VMWare) where cache sizing/utilization is a difficult but important problem to solve.

The application 100 can be any typical application running on an Operating System such as, for example, windows, unix, linux, or other types of Operating Systems. The application 100 stores data to and retrieves data from the storage 103 which can be any form of a permanent storage device such as, for example, a hard disk based storage (e.g., hard disk drive). The storage 103 could be locally attached, SAN attached (storage area network attached), or network attached. The storage 103 is accessed via the Storage Stack 102 which is typically a set of OS drivers like disk, SCSI, iSCSI, NFS, and/or FileSystem.

The application 100 issues IO requests 152 which can either be a read or a write (501). These IO requests 152 are intended for the Storage Stack 102. The Monitor 101 records the nature of the 10 requests 152 (510) and passes this recorded nature 155 unmodified (502). The Storage Stack 102 forwards the recorded nature 155 to the actual storage component 103 (503). The nature 155 were similarly described above. Therefore, the Monitor 101 records the heuristics of the IO requests 152 to determine which of the IO requests are important.

When the IO request 152 is completed, the notification 160 is intercepted (504) by the monitor 101. Similar monitoring (507) of application-level heuristics 153 is performed at the application level by the application monitor 106. This application monitor 106 discovers various components of the application 100 (components such as, e.g., databases, indexes, collections, tables, etc.) which can be accelerated and determines using application specific strategies components which are frequently accessed and components that are key to application performance (e.g., indexes). These discovered components are semantically-relevant contents. The application monitor 106 determines the layout of such components on the primary storage 103. The application monitor 106 builds further statistics about the underlying storage subsystem and the application on top. This flow (500) continues for a well-defined period of time (monitor phase) which can be, for example, approximately 24 hours. An application monitor 106 is highly specific for each application 100 type.

As an example, if an application 100 issues IOs 152, the monitor 101 records the IO-level heuristics 155, while the application monitor 106 records the application-level heuristics 153, and the analyzer 104 monitors and correlates the IO-level heuristics 155 and application-level heuristics 153.

The acceleration strategy flow 700 is now described. The Analyzer 104 periodically harvests the raw statistics 165 from the monitor 101 (601), where the raw statistics 165 includes the recorded IO-level heuristics 155 and also harvest the application-level heuristics 153 from the application monitor 106 (602). Based on the IO-level heuristics 155 and application-level heuristics 153, the analyzer 104 then determines the best parameters for the cache unit size, cache capacity, read cache size, write cache size, the regions of the primary storage 103 which are most important and regions which exhibit a good locality of reference, and these types of regions are candidates for cache acceleration. The Analyzer 104 predicts the optimal application performance based on the above settings and recommends (sends) cache provisioning hints 170 and an acceleration strategy 175 to the caching engine 105 (701). For example, the analyzer 104 can determine and/or correlate (based on the statistics in the IO-level heuristics 155 and application-level heuristics 153) the regions of the storage 103 that are highly accessed, the shapes of the IOs, the frequency of the need to perform a copyback since copybacks determine system performance in order to determine a policy 168 which includes cache provisioning hints 170 and an acceleration strategy 175. For example, a policy 168 determines that for a given block size, the particular regions of the storage 103 have to be accelerated because they are indexes, and/or a given amount of cache space has to be provisioned for a given amount (e.g., 20%) of the application data set which is accessed at a given amount (e.g., 80%) of time, and/or a given amount of cached space has to be provisioned for accelerating writes, and/or the rate to be set for a writeback and/or copyback since the rate of a copyback has to be set so as to prevent consumption of most of the cache space. Accordingly, the analyzer 104 correlates and analyzes the application-level heuristics 153 and IO-level heuristics 155 so that the analyzer 104 generates a policy 168.

Another example of an acceleration policy 168 is now discussed. For an analytics workload, a policy 168 (e.g., write back acceleration policy 168) which accelerates every write would result in near SSD performance. The write back policy is chosen in response to understanding the workload characteristics—the spread and shape of the IO along with the sequential write followed by random reads. The key here is that while it is a write back policy, it should be noted that every write is optimized.

For a transaction processing workload, a write back policy is employed, but not every write is optimized. Upon monitoring and determining the available cache space, only select writes are optimized to ensure that the cache does not "thrash". Thrashing of the cache is a condition where frequently blocks are placed and removed from the cache resulting in sub optimal performance.

Any important application IO 501 is service by the caching engine 105 and routed (506) to a high performance cache storage 107. In one embodiment of the invention, the cache storage 107 is at least one solid state device (SSD). Unimportant application IOs (or less important application IOs) are routed (503) to the primary storage 103. The less important IOS are stored in queue and are scheduled for processing in a sequential manner so to maximize the disk bandwidth during communications.

As an example, in a database transaction processing system, index IO and certain parts of table data are very important portions of system data and are cached. Therefore, these very important portions of system data are routed (506) to the cache 107. The rest of the system data like undo log, redo log, secondary tables are routed (503) to the primary storage 103.

As another example, in a web server application, depending on the activity, some of the website pages are important and are cached. Therefore, these website pages that are important are routed (506) to the cache 107. The rest of the website data (pages) and website logs are not important and are passed on and routed (503) to the primary storage 103.

In an embodiment of the invention, the above components 101, 104, and 106, the caching engine 105 is able to make a sound decision on what and how much to cache for optimal system performance with minimal cache storage 107.

Figure 2:
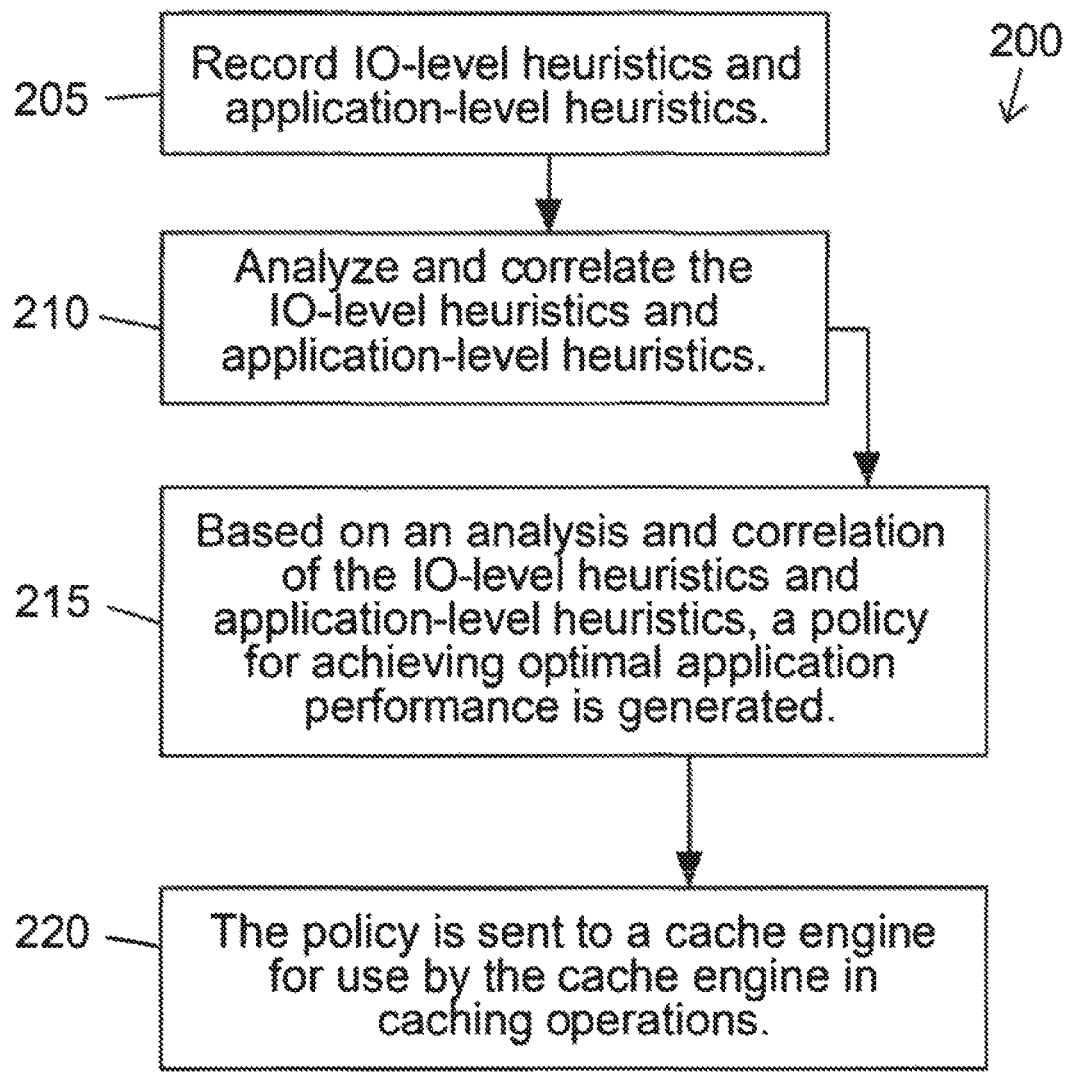
FIG. 2 is a flowchart of a method in accordance with an embodiment of the invention.

FIG. 2 is a flowchart of a method 200 in accordance with an embodiment of the invention. At 205, application-level heuristics and IO-level heuristics are recorded.

At 210, the application-level heuristics and IO-level heuristics are correlated and analyzed.

At 215, based on an analysis and correlation of the application-level heuristics and IO-level heuristics, a policy 168 for achieving optimal application performance is generated by the analyzer 104.

At 220, the policy 168 is sent to a cache engine 105 for use by the cache engine 105 in caching operations.

Accordingly, an embodiment of the invention provides a method comprising: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance.

In another embodiment of the invention, the method further comprises: sending the policy to a cache engine for use by the cache engine in caching operations.

In yet another embodiment of the invention, an apparatus comprises: a system configured to record application-level heuristics and IO-level (input/output-level) heuristics, to correlate and analyze the application-level heuristics and IO-level heuristics, and based on an analysis and correlation of the application-level heuristics and IO-level heuristics, to generate a policy for achieving optimal application performance.

In yet another embodiment of the invention, the apparatus comprises the system that is further configured to send the policy to a cache engine for use by the cache engine in caching operations.

In yet another embodiment of the invention, an article of manufacture comprises: a non-transient computer-readable medium having stored thereon instructions that permit a method comprising: recording application-level heuristics and IO-level (input/output-level) heuristics; correlating and analyzing the application-level heuristics and IO-level heuristics; and based on an analysis and correlation of the application-level heuristics and IO-level heuristics, generating a policy for achieving optimal application performance.

In yet another embodiment of the invention, the article of manufacture includes instructions that permit the method further comprising: sending the policy to a cache engine for use by the cache engine in caching operations.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   monitoring an input/output (IO) stream between an application and at least one storage device with an IO monitor;
   recording application-level heuristics that include information pertaining to a plurality of characteristics associated with the application;
   recording IO-level heuristics in IO requests including information pertaining to a plurality of characteristics associated with the IO stream between the application and the at least one storage device;
   correlating the recorded IO-level heuristics with the recorded application-level heuristics to determine at least one optimizable cache parameter for a performance increase corresponding to the IO stream;
   generating a caching policy based on the at least one optimizable cache parameter;
   selecting cache settings based on the caching policy; and
   configuring a cache unit based on the selected cache settings.

2. The method of claim 1, wherein the at least one storage device includes either or both a hard disk drive (HDD) and a solid state device (SSD).

3. The method of claim 2, further comprising sending a portion of the IO stream designated as being important to the SSD.

4. The method of claim 2, further comprising sending a portion of the IO stream designated as being unimportant to the HDD.

5. The method of claim 1, further comprising generating an acceleration policy including the at least one optimizable cache parameter.

6. The method of claim 5, wherein the acceleration policy further includes either or both cache provisioning hints and an acceleration strategy.

7. The method of claim 1, wherein the characteristics associated with the stream are selected from a group consisting of the following: shape/distribution; burstiness; distribution of the size; predominance of reads/writes; whether the IO stream is sequential or random; sizes and rates; and whether the IO stream is exhibiting a locality of reference or a great amount of randomness.

8. The method of claim 1, wherein the characteristics associated with the application include characteristics of at least one selected from the following group: a database, an index, a collection, and a table.

9. The method of claim 1, wherein the at least one optimizable cache parameter is selected from the following group: cache unit size; cache capacity; read cache size; write cache size; regions of the at least one storage device designated as being important; and regions of the at least one storage device designated as being unimportant.

10. A non-transitory computer-readable storage medium storing instructions that, when executed by a processor, cause the processor to perform the method of claim 1.

11. A system, comprising:
   at least one storage device;
   an input/output (IO) monitor configured to interact with an application, to collect information pertaining to a plurality of characteristics associated with the application, and to collect information pertaining to a plurality of characteristics associated with an IO stream between the application and the storage device;
   an IO stream analyzer coupled with the IO monitor and configured to determine at least one optimizable cache parameter for a particular performance boost corresponding to the IO stream based on the plurality of characteristics associated with the application and the plurality of characteristics associated with the IO stream; and
   a caching engine configured to interact with a storage stack to perform caching operations with the at least one storage device based on the at least one optimizable cache parameter determined by the IO stream analyzer.

12. The system of claim 11, wherein the at least one storage device includes either or both a hard disk drive (HDD) and a solid state device (SSD).

13. The system of claim 12, wherein the caching engine is further configured to direct the storage stack to send a portion of the IO stream designated as being important to the SSD.

14. The system of claim 12, wherein the caching engine is further configured to direct the storage stack to send a portion of the IO stream designated as being unimportant to the HDD.

15. The system of claim 11, wherein the IO stream analyzer is configured to generate an acceleration policy including the at least one optimizable cache parameter.

16. The system of claim 15, wherein the acceleration policy further includes either or both cache provisioning hints and an acceleration strategy.

17. The system of claim 11, wherein the characteristics associated with the IO stream are selected from a group consisting of the following: shape/distribution; burstiness; distribution of the IO size; predominance of reads/writes; whether the IO stream is sequential or random; sizes and rates; and whether the IO stream is exhibiting a locality of reference or a great amount of randomness.

18. The system of claim 11, wherein the characteristics associated with the application include characteristics of at least one selected from the following group: a database, an index, a collection, and a table.

19. The system of claim 11, wherein the at least one optimizable cache parameter is selected from the following group: cache unit size; cache capacity; read cache size; write cache size; regions of the at least one storage device designated as being important; and regions of the at least one storage device designated as being unimportant.

20. The system of claim 11, wherein the application is running on either a UNIX operating system or a Linux operating system.

* * * * *